United States Patent
Campbell et al.

(10) Patent No.: US 11,017,487 B1
(45) Date of Patent: May 25, 2021

(54) SYSTEMS AND METHODS FOR ASSESSING PROPERTY CONDITION

(71) Applicant: UIPCO, LLC, San Antonio, TX (US)

(72) Inventors: Joseph Campbell, New Braunfels, TX (US); Ryan Day Goree, Boerne, TX (US); Carlos Valenzuela, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 453 days.

(21) Appl. No.: 15/826,293

(22) Filed: Nov. 29, 2017

Related U.S. Application Data (60) Provisional application No. 62/427,504, filed on Nov. 29, 2016.

(51) Int. Cl.
*G06Q 50/16* (2012.01)

(52) U.S. Cl.
CPC ........... *G06Q 50/16* (2013.01); *G06Q 50/163* (2013.01)

(58) Field of Classification Search
CPC .......... G06K 9/00671; G06K 2209/21; G06K 9/00221; G06K 9/00523; G06K 9/00577; G06K 9/00597; G06K 9/00624; G06K 9/00664; G06K 9/00744; G06K 9/209; G06K 9/22; G06K 9/3241; G06K 9/46; G06K 9/6262; G06K 9/6288; G06K 9/72; G06K 9/78; G06Q 40/08; G06Q 10/047; G06Q 10/06311; G06Q 10/083; G06Q 20/10; G06Q 30/0261; G06Q 30/0267; G06Q 30/0269; G06Q 30/0601; G06Q 30/0613; G06Q 30/0623; G06Q 30/0625; G06Q 30/0635; G06Q 50/165; G06Q 50/30; G06Q 50/16
See application file for complete search history.

(56) References Cited

U.S. PATENT DOCUMENTS

| | | | |
|---|---|---|---|
| 6,115,694 A * | 9/2000 | Cheetham | G06Q 30/06 705/7.35 |
| 9,536,148 B2 * | 1/2017 | Gross | G06F 16/5838 |
| 10,453,146 B1 * | 10/2019 | Stricker | G06Q 40/08 |
| 2003/0078897 A1 * | 4/2003 | Florance | G06Q 40/04 705/80 |
| 2004/0153330 A1 * | 8/2004 | Miller | G06Q 50/16 705/38 |

(Continued)

OTHER PUBLICATIONS

Anatoliy Kovalcuk, Natalia Lotshynska, Assessment of Damage to Building in Areasemergency Situations, IEEE First International Conference on Data Stream Mining & Processing (Year: 2016).*

*Primary Examiner* — Minnah L Seoh
*Assistant Examiner* — Michael J. Monaghan
(74) *Attorney, Agent, or Firm* — Fletcher Yoder P.C.

(57) ABSTRACT

A technique for assessing property condition is provided that determines property condition for an individual property of interest using primary property records specific to the property of interest (e.g., construction records) and secondary property information (weather in the surrounding geographic area, neighborhood characteristics). In certain embodiments, where a primary property record is missing or incomplete, the secondary property information may be used to extrapolate the missing information.

20 Claims, 4 Drawing Sheets

(56) References Cited

U.S. PATENT DOCUMENTS

| | | | |
|---|---|---|---|
| 2014/0279593 A1* | 9/2014 | Pershing | G06Q 50/163 705/314 |
| 2015/0088556 A1* | 3/2015 | Convery | G06Q 40/08 705/4 |
| 2015/0228031 A1* | 8/2015 | Emison | G06F 16/116 705/4 |
| 2015/0235322 A1* | 8/2015 | Emison | G06Q 40/08 705/4 |
| 2015/0310557 A1* | 10/2015 | Engelhorn | G06K 9/00637 705/4 |
| 2015/0370986 A1* | 12/2015 | Hayward | G06K 9/46 705/2 |
| 2016/0027051 A1* | 1/2016 | Gross | G06Q 50/16 705/14.54 |

* cited by examiner

SYSTEMS AND METHODS FOR ASSESSING PROPERTY CONDITION

CROSS-REFERENCE TO RELATED APPLICATION

This application claims priority to and the benefit of U.S. Provisional Application No. 62/427,504, entitled "SYSTEMS AND METHODS FOR ASSESSING PROPERTY CONDITION," filed Nov. 29, 2016, which is hereby incorporated by reference in its entirety for all purposes.

BACKGROUND

The present disclosure relates generally to systems and methods for assessing property condition. More specifically, the present disclosure relates to techniques that facilitate rapid evaluation of a property condition, even in the absence of a physical review of the property. The present disclosure also relates to user interfaces that permit a user to review property condition for a property of interest.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a communication component configured to receive a user input identifying an individual property and a memory storing a file related to the individual property, the file comprising a plurality of property information fields. The system may also include a processor configured receive the user input identifying the individual property; access primary property records associated with the individual property, wherein the primary property records comprise one or more of construction permit information associated with the individual property and an age of the individual property; access secondary property information comprising neighborhood property records for additional properties within a predefined geographic area that includes the individual property and historical weather information relating to the predefined geographic area; populate the plurality of property information fields of the file using the primary property records to generate filled property information fields and missing property information fields; populate the missing property information fields with the secondary property information to generate supplemental filled property information fields; determine a condition of the individual property by accessing the file and using the filled property information fields and the supplemental filled property information fields as variable inputs to a property condition model; generate a property condition output; and provide the property condition output to a user.

Provided herein is also a method that that includes the steps of receiving user input identifying an individual property; creating and storing a file associated with the individual property in response to receiving the user input; accessing primary property records associated with the individual property, wherein the primary property records comprise one or more of construction permit information associated with the individual property and an age of the individual property; accessing secondary property information comprising neighborhood property records for additional properties within a predefined geographic area that includes the individual property and historical weather information relating to the predefined geographic area; populating property information fields of the file using the primary property records and the secondary property information; determining that a minimum set of property information fields is populated in the file; determining a condition of the individual property by accessing the file and using the populated property information fields as variable inputs to a property condition model when the minimum set is populated; generating a property condition output using the property condition model with the variable inputs; and providing the property condition output to a user.

Provided herein is also a method that includes the steps of receiving a request from a user device; determining a location of the user device; accessing primary property records associated with a plurality of individual properties within a predetermined distance of the user device, wherein the primary property records comprise one or more of construction permit information associated with the plurality of individual properties and an age of the plurality of individual properties; accessing weather information for the predetermined geographic area including the plurality of individual properties; estimating a condition of each of the plurality of individual properties based on the primary property records and the weather information; generating a property condition output for each of the plurality of individual properties based on the estimating; and providing the property condition outputs to a user.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Home buyers have increasingly relied on internet resources to find and evaluate properties of interest when buying homes. For example, a home buyer may search a database of properties for sale or may rely on internet tools that estimate home value. However, these internet tools do not provide information about the condition of an individual property. Indeed, such determinations are typically made in person and/or after an inspection has been performed. This bottleneck in the home evaluation process may lead home buyers to waste time considering properties that are in subpar condition. Further, ordering inspections is expensive, and these costs may be borne by the home buyer. It would be beneficial to provide a tool for evaluating individual properties that provides a rapid on-demand, e.g., within seconds or minutes from the time of query, estimate of property condition and without requiring an in-person inspection to be performed. In addition, such information may be beneficial for other institutions that rely on home condition. For example, a home buyer or institution may use such a tool to assess potential insurance costs for a property.

To that end, the present techniques provide a tool for evaluating property condition that does not require an in-person inspection and that produces an on-demand condition estimate. The techniques identify properties that are likely to require repairs within a particular time frame. In one embodiment of the disclosed techniques, a user interface is provided that allows users to easily assess the condition of a property, even if the condition assessment is contingent upon multiple complex variables. Provided herein is a novel property condition index, score, or other indicator.

The present techniques provide more rapid and comprehensive home condition analysis relative to other proxy measures for determining home condition, such as a credit score for the property owner or information about notices of potential claims (NPCs) for the property holder. Further, for an on-demand user evaluating neighborhood properties, credit score information of the home owner may be confidential or unavailable for consideration.

Figure 1:
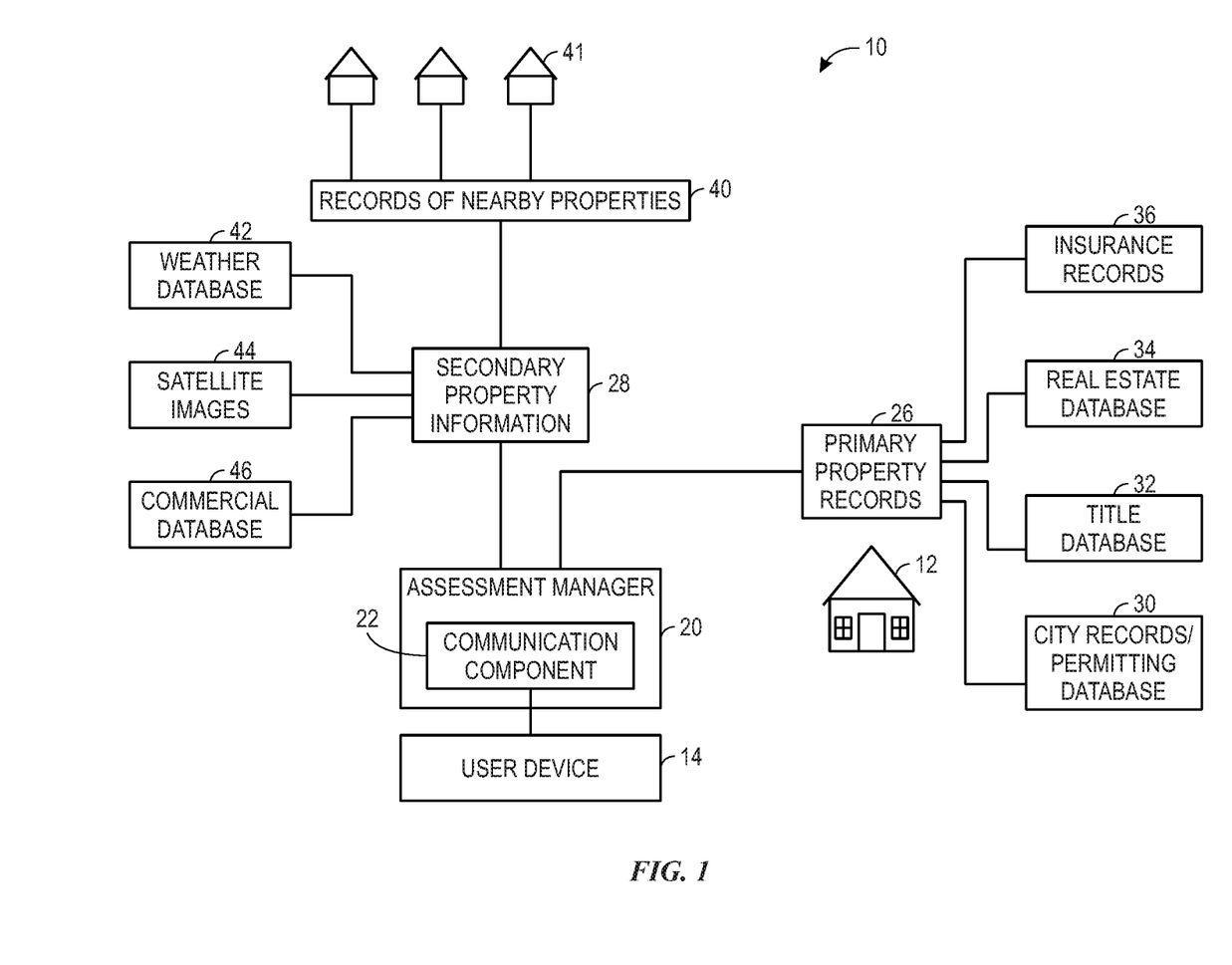
FIG. 1 illustrates a schematic diagram of a property condition assessment system, in accordance with embodiments described herein.

By way of introduction, FIG. 1 is an example of a system 10 for property condition assessment that provides an on-demand assessment of one or more individual properties 12. The individual properties 12 may be residential properties (e.g., standalone single family homes, condominium units, townhomes, multifamily dwellings, etc.) and/or may be commercial properties. Included in the system is a user device 14 from which the initial query regarding property condition is generated. The user device may be a general-purpose personal computer, a laptop computer, a tablet computer, a mobile computer, a mobile device (e.g., cell phone), etc. The system also includes an assessment manager 20 in communication with the user device 14 and configured to receive the initial query via a communication component 22.

The assessment manager 20 is also in communication with various sources of primary property records 26 and secondary property information 28. Primary property records 26 may include recorded information that is specific to the individual property 12 of interest to the user. For example, such information may be accessed from publically available city records and/or permitting databases 30, title databases 32, real estate databases 34, and/or insurance records 36. In one embodiment, the permitting database 30 may have a record for a construction permit for a new roof for the individual property 12. Based on the difference between the permit date and the time of the query from the user device 14, the age of the roof may be determined. The permitting database 30 may also have a record of construction for the individual property 12 from which the age of the individual property 12 may be determined as well as the construction materials used. Property age information may also be pulled from a tax assessment database.

In certain embodiment, assessment manager 20 may also access secondary property information 28, i.e., information that is not specific to the individual property 12, but instead may provide data about the geographic area that in turn may be used as part of the property condition assessment for the individual property 12. Such secondary property information 28 may be records of nearby properties 40. For example, such records may be specific to one or more nearby properties 41 located within a predetermined geographic distance d (e.g., 1 mile, 5 miles, 10 miles) from the individual property 12. In one example, if there is no house age information available in the primary property records 26, the assessment manager 20 may access house ages from the nearby properties 41 and estimate the house age of the individual property 12 using rules-based algorithms. For example, if all of the nearby properties 41 have house ages within a narrow band (e.g., 1-5 years), the assessment manager 20 may extrapolate that the individual property 12 has a similar house age.

Other secondary property information may include weather information from a weather database 42. The weather information may include number of extreme weather events (flooding, hurricanes) within a predetermined distance (e.g., 50 miles or less) of the individual property 12, yearly snow accumulation, yearly rainfall accumulation, wind speed max over a one year period, etc. Additional information may include satellite images of the individual property 12 and nearby properties 41 as well as other information from commercial databases 46 or other types of databases, such as housing survey data or information related to crime in the geographic area in which the individual property 12 is located.

In another embodiment, secondary property information 28 may include information related to home renovation activity based on the records for nearby properties 40, which may be assessed from the permitting databases 30. Because renovation is influenced by neighborhood effects, an individual property 12 surrounded by nearby properties 41 with higher-than-average renovation activity may be in better condition. High-than-average activity may be relative to a local, state, or national baseline activity.

Figure 2:
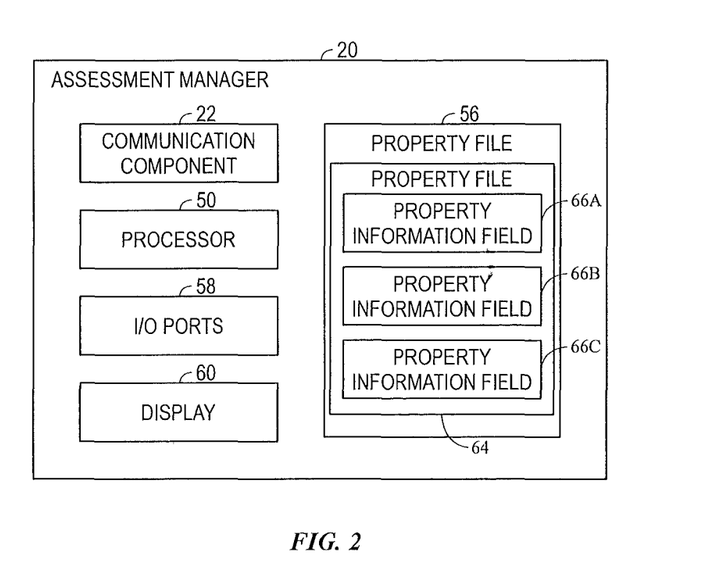
FIG. 2 illustrates a block diagram of a computing system that may be used in conjunction with the system of FIG. 1, in accordance with embodiments described herein.

The assessment manager 20 accesses the primary property records 26 and secondary property information 28 upon receipt of a user query to obtain information related to the individual property and in turn make an assessment of the property condition. FIG. 2 is a block diagram of example components within an exemplary assessment manager 20 in accordance with present embodiments. However, it should be understood that certain components of the assessment manager 20 may also be present in the user device 14. Accordingly, the following section may also relate to hardware components of the user device 14. The assessment manager 20 may include any suitable computer device, such as a general-purpose personal computer, a laptop computer, a tablet computer, a mobile computer, and the like that is configured in accordance with present embodiments. The assessment manager 20 may include various types of components that may assist the assessment manager 20 in performing various types of computer tasks and operations. For example, the assessment manager 20 may include a communication component 22, a processor 50, a memory 56, input/output (I/O) ports 58, a display 60, and the like. The communication component 22 may be a wireless or wired communication component that may facilitate communication between the assessment manager 20 and various other computing systems via a network, the Internet, or the like.

The processor 50 may be any type of computer processor or microprocessor capable of executing computer-executable code. The processor 50 may also include multiple processors that may perform the operations provided herein.

The memory 56 may be any suitable article of manufacture that can serve as media to store processor-executable code, data, or the like. These articles of manufacture may represent computer-readable media (e.g., any suitable form of memory or storage) that may store the processor-executable code used by the processor 50 to perform the presently disclosed techniques. The memory 56 may represent non-transitory computer-readable media (e.g., any suitable form of memory or storage) that may store the processor-executable code used by the processor 50 to perform various techniques described herein. It should be noted that non-transitory merely indicates that the media is tangible and not a signal.

The I/O ports 58 may be interfaces that may couple to other peripheral components such as input devices (e.g., keyboard, mouse), sensors, input/output (I/O) modules, and the like. The display 60 may operate to depict visualizations associated with software or executable code being processed by the processor 50. In one embodiment, the display 60 may be a touch display capable of receiving inputs from a user of the assessment manager 20. The display 60 may be any suitable type of display, such as a liquid crystal display (LCD), plasma display, or an organic light emitting diode (OLED) display, for example. Additionally, in one embodiment, the display 60 may be provided in conjunction with a touch-sensitive mechanism (e.g., a touch screen) that may function as part of a control interface for the assessment manager 20.

It should be noted that the components described above with regard to the assessment manager 20 are exemplary components and the assessment manager 20 may include additional or fewer components as shown.

In certain embodiments, the memory 56 stores a property file 64 that is generated in response to a user initiating a property condition query. The property file includes multiple property information fields 66 that are populated with information about the property and other variables that may influence property condition, such as extreme weather exposure, etc, as disclosed herein. The property information field designations may be stored in the memory 56 and accessed as part of generating the property file 64. The property information field designations may be universal, e.g., the same across property files 64 generated for different properties, while the populated information in each field varies as appropriate for respective properties. In one example, the property information field 66 is a roof material field or a roof age field. In another example, if the property information field 66 cannot be filled based on one or more of the primary property records 26 and/or the secondary property information 28, the property information field 66 may be considered a missing field. It should be understood that the property file 64 may include any suitable number of property information fields 66 (e.g., 66a, 66b, 66c, and so on), each representing a different property variable. Examples of such variables may include the following, which are provided as non-limiting examples.

1. Year of construction (structure)
  2. Year of construction (roof)
  3. Roof type
  4. Wall type
  5. Weather conditions of location
  6. State in which property is located
  7. High vacancy block group indicator (>=0.16)
  8. # of shopping centers, 13 km
  9. Tenure
  10. # of severe weather days in zip code since 2000
  11. Loss count
  12. High water-loss frequency zip code clusters
  13. Age of home specific to high water-loss frequency zip code clusters
  14. High condition hazard rate states (HCHR) (5 groups: from very low to very high)
  15. # of severe weather days in zip code since 2000 for HCHR states In certain embodiments, certain property information fields 66 may represent a minimum set that, when populated, permit the assessment manger 20 to proceed with property condition assessment. In such an embodiment, when a property information field 66 within the minimum set is not populated, an error message may be displayed. In one embodiment, the user may be invited to estimate or provide the missing information. In one example, the assessment manager 20 may be programmed to only proceed with the property condition assessment as provided herein when information such as property age, roof age, and heating type is available, either from primary property records (e.g., primary property records 26, see FIG. 1) or as estimated or extrapolated from secondary property information (e.g., secondary property information 30, see FIG. 1). Other property information fields 66, such as weather, may be assumed to always be available and, accordingly, may not be part of the minimum set. In another embodiment, the property information field 66 may be populated in a hierarchical manner and from the primary property records 26 before the secondary property information 28. That is, if the primary property records 26 do not have available data to populate the relevant property information field 66, then secondary property information 28 is used. However, certain property information fields 66, such as weather, may be filled only from secondary property information 28.

While the property information may be stored as a file, e.g., a table, with populated fields, other data structures are also contemplated. For example, the property information may be stored in a database including information relating to multiple properties.

Figure 3:
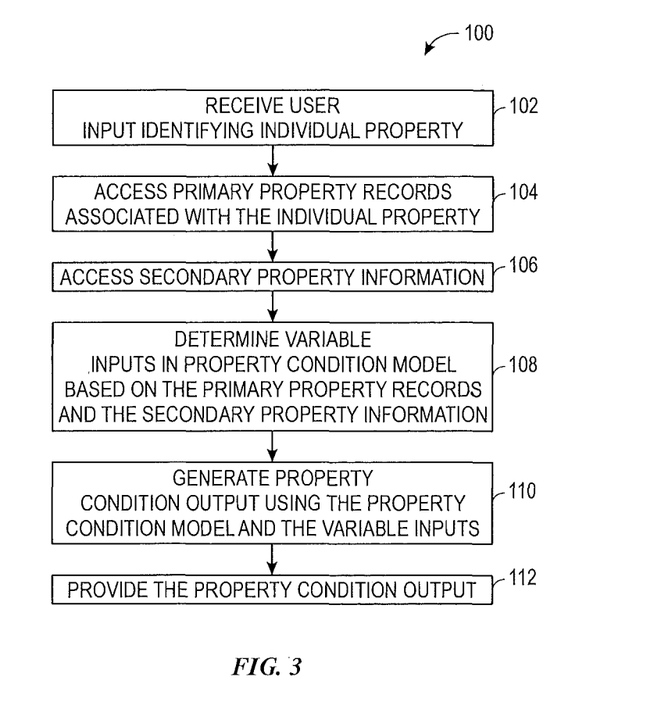
FIG. 3 illustrates a flow diagram for assessing a property condition in accordance with embodiments described herein.

FIG. 3 is a flow diagram of a method 100 of property condition assessment as provided herein. To initiate the method 100, a user may enter a property address into a displayed field of a web-based interface or an application downloaded on the user device (e.g., user device 14, see FIG. 1) to initiate a query of property condition (step 102). The user may be an interested home buyer who has received listings from a real estate agent and the method 100 may be employed to rank or eliminate various properties from consideration. In another embodiment, the user may enter a street address or neighborhood into the query field to perform the method 100 on a group of properties.

The query information, at least including the home address or other information identifying the individual property, is received by the assessment manager, e.g. assessment manager 20, and the assessment manager accesses available primary property records for the individual property (step 104) and accesses secondary property information (step 106). The available data includes property-specific data, such as date of construction, size of dwelling, estimated property value, etc., as well as data representative of similar properties. The available data from the primary property records and the secondary property information is used to determine variable inputs to a property condition model for the individual property (step 108), which in turn generates a property condition output (step 110) that is provided to a user (step 112).

The techniques disclosed herein model a likelihood that the individual property of interest is in need of repair and/or is in good (e.g. above average) or poor (e.g., below average) condition. The techniques assess the likelihood of a property to have one or more hazard findings. For example, a property with condition hazards that contains substantial deterioration that impacts structural integrity of the property, active (known or unknown) knob and tube (pre-1960s), and missing shingle/tiles (10% of roof or greater) would be categorized as a property found to have a condition hazard. Predicting the number of condition hazards does not necessarily mean that properties with higher numbers of condition hazards are a greater risk than those with fewer number of condition hazards. For example, placing emphasis on properties likely to contain more than one hazard may give the impression that finding more is better. However, it could be that the one hazard that is found is a major hazard. However, other embodiments may be directed to assessing more than one hazard.

In one implementation, a logistic regression is used to provide a binary condition hazard finding=yes/no or 1/0. Techniques for such variables include, but are not limited to, logistic, probit, and complementary log-log models. Logistic regression is used (e.g., a generalized linear model with a logit link function to constrain predictions between 0 and 1) to predict the probability that a property has a condition hazard to guide selecting properties to inspect. The regression equation is the natural log of the probability of finding a condition hazard divided by the probability of not finding a condition hazard following a home inspection, and takes the following form:

$$\ln\left(\frac{p}{1-p}\right) = \alpha + \beta_1 x_1 + \beta_2 x_2 + \beta_n x_n$$

where:
p is the probability that the event occurs [or p(y=1)],
(1−p) is the probability that the event does not occur [or p(y=0)]
p/(1−p) is the odds,
ln[p/(1−p)] is the log odds (or logit),
α is the intercept,
$x_{i\ldots n}$ are the predictor variables, and
$\beta_{i\ldots n}$ are the estimated coefficients for variables $x_{i\ldots n}$.

For the model, the variables ($x_1 \ldots x_n$; both quantitative—numeric/continuous/ordered categorical—and qualitative—dummy/nominal/unordered categorical) correspond to the accessed information from primary property records and secondary property information (see FIG. 1). The βs are estimated using maximum likelihood. In order to estimate the predicted probability ($\hat{Y}$) of a condition hazard finding for a property, take the inverse of the logit function, which is:

$$\hat{Y} = \frac{e^{\alpha+\beta_1 x_1 + \beta_2 x_2 + \ldots \beta_n x_n}}{1 + e^{\alpha+\beta_1 x_1 + \beta_2 x_2 + \ldots \beta_n x_n}}$$

With regard to the individual variables and their relationship to hazard conditions, older homes are likely to be in poorer conditions than newer homes because of the possible cumulative toll of damage or disrepairs, which are not as likely to occur among newer homes. Likewise, the age of roof is important because of the exposure to weather elements, such as rain, hail, and snow. There is also variation in quality of roof materials. For instance, aluminum roofs may last longer than roofs made of wood. The condition of the home also may depend on how well the home is maintained and many of the condition hazard guidelines are related to maintenance. Homes with existing data were analyzed to test the model.

Table 1 shows example variable thresholds from a potential applied model. For example, houses that are less than 50 years old are not likely to have a condition hazard while houses that are older than 60 years are. The coefficients for the variables may be determined from the training set as provided herein.

TABLE 1

Example of Mean of the Distribution for Continuous Variables for Entire Sample and by Hazard Findings

| Variables | All | CH = No | CH = Yes |
|---|---|---|---|
| Year of construction (structure) | 50.17 | 48.81 | 60.12 |
| Year of construction (roof) | 16.29 | 15.68 | 20.68 |

Logit of outcome variable is a linear combination of the independent (predictor) variables. Several non-linear methods were tested and the logit performed among the strongest model forms (excluding ensemble models). A linear relationship between continuous predictors and the logit transform of the outcome variable is observed. Relationships may be linearly or non-linearly related to the logit of the outcome variable. To account for measurement error in the property information, factor analysis may be used in the model. Other assumptions include the absence of multivariate outliers and independence of observations. That is, the outcome of an event (i.e. condition hazard findings) on a property does not depend on another property's finding. An additional assumption was the absence of multicollinearity. Multicollinearity is often tested using the variance inflation factor (VIF).

TABLE 2

Logistic Regression Model Coefficients

| Variables | Training Data (N = 62,183) |
|---|---|
| Intercept | −2.4556 |
| Year of construction (structure) | 0.0702 |
| Year of construction (roof) | 0.0532 |

Examples of condition hazards/concerns include significant damages to a dwelling and/or require repairs, such as structural (i.e. foundational problems, rotted support beams, broken or boarded up windows, etc.), roof (i.e. leaks, missing or worn-out shingles, detached/damaged gutters, etc.), plumbing (i.e. damaged pipes or fixtures, evidence of water leak and/or mold damage, etc.), and electrical (i.e. exposed/damaged/worn wiring, improper installation, overloading, etc.) deficiencies.

Results from a potential logistic regression model is shown on Table 2. As homes get older, the likelihood of finding a condition hazard increases; and the results are similar for roof year of construction. The variables provided are by way of example, and the regression model may include additional variables as provided herein (e.g., two or more variables, five or more variables, ten or more variables, twenty or more variables).

For each variable, scores may be assessed. In one example, variables may be associated with a positive or negative score, as shown in Table 3

TABLE 3

Variable Scoring

| Variable Score | Response |
|---|---|
| 1 | YES (positive response) |
| 2 | NO (negative response) |
| B | N/A |
| D | DON'T KNOW |
| R | REFUSED |
| Blank | NOT REPORTED |

The method may sum the variable scores to create an index, whereby higher index scores are associated with better maintenance than lower scores. The method may also assess an average score of nearby properties 41 to determine a neighborhood score.

Table 4 shows a specific embodiment showing examples of variables that may be used to assess property condition. In certain embodiments, all or a subset of the disclosed variables may be used to assess primary property and/or secondary property condition.

TABLE 4

Property Assessment Variables

Variable Description
Year unit bought/obtained/received
Age of Home
Change in square footage of unit
Smoke detector batteries replaced in last 6 months TABLE 4-continued Property Assessment Variables Rating of unit as a place to live
Unit has carbon monoxide detector
Unit has a fire extinguisher
Householder's health
Mold present in home
Fuses blown or circuit breakers tripped
Any inside water leaks in last 12 months
Any outside water leaks in last 12 months
Any toilet breakdowns in last 3 months
Sewage system condition
Holes/cracks or crumbling in foundation
Roof missing shingles/other roofing materials
Roof has holes
Roof's surface sags or is uneven
Outside walls missing siding/bricks/etc
Outside walls slope/lean/slant/buckle
Windows broken
Windows boarded up
Electrical wiring concealed by walls/wiring
Every room has working electrical plug
Open cracks wider than dime
Holes in floor
Area of peeling paint larger than 8 × 11

In one embodiment, the property condition model may be fit to ordered inspection data. That is, when the model recommends ordering an inspection, the inspection data may then be fed into the model to determine whether the inspection order found a maintenance issue, i.e., a condition concern.

Figure 4:
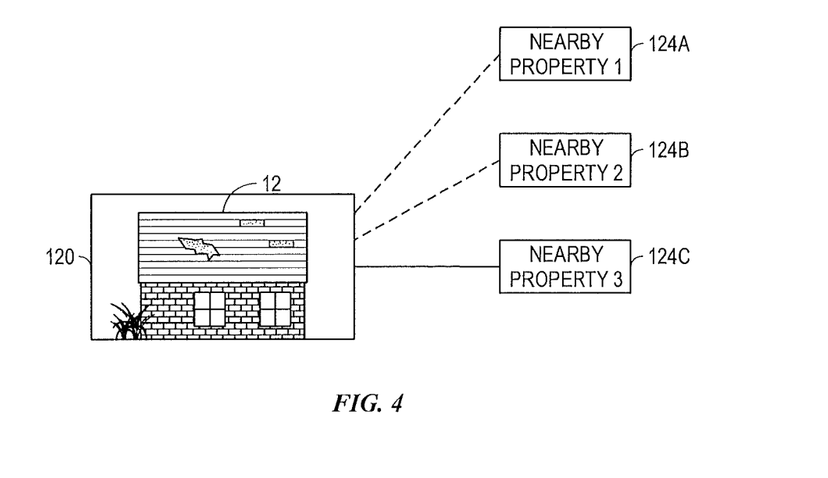
FIG. 4 illustrates an example of property condition assessment using property-specific data and estimated data, in accordance with embodiments described herein.

In one embodiment, the techniques use acquired image data (e.g., aerial image data, satellite image data) from available databases to estimate certain condition parameters of the property. Using image analysis techniques, for example, a roof age and/or roof material may be estimated. In another embodiment, the total roof surface area may be estimated from the image data, which in turn may be used as a variable in assessing property condition. FIG. 4 is an example of image data 120 of the individual property 12 of interest. In one embodiment, the techniques access available image data 124 of nearby properties. A closest match, shown in FIG. 4 as corresponding to the image data 124c associated with nearby property 3, triggers the assessment manager to use the roof type and/or age, if available, from the secondary property information, to estimate the roof type and/or age for the individual property 12. The image matching may be performed according to suitable techniques, such as pattern matching, feature recognition, etc.

Figure 5:
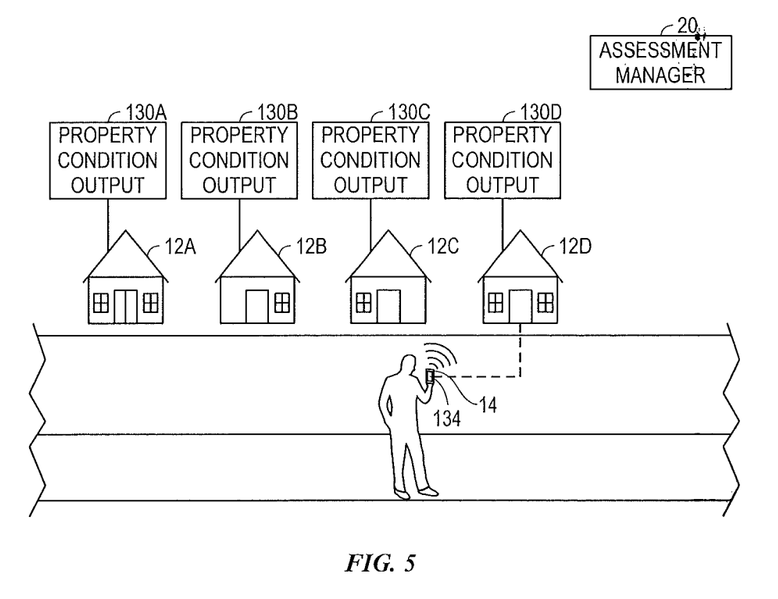
FIG. 5 illustrates a schematic diagram of an implementation of a property condition assessment system, in accordance with embodiments described herein.

FIG. 5 is a schematic diagram of location-based property condition information that is pushed to the user device 14 located within a predetermined geographic area. For example, for a user that is driving or walking in a particular area, the assessment manager 20 may identify the user device 14, determine its location (e.g., via GPS information), acquire property addresses of individual properties 12 within the particular area, and automatically push the property condition output 130 to a display 134 of the user device 14. In one embodiment, the assessment manager 20 may provide the property condition output 130 of each individual property 12 as part of a ranked list. In another embodiment, the user device 14 may, upon receiving the property condition outputs 130, initiate display of a navigation route to an individual property, e.g., individual property 12d, indicated as the top-ranked or lowest condition hazard risk property. In another example, the property condition output 130 may be filtered, so that no properties having greater than a certain percentage of condition hazard are provided to the user device 14.

As provided herein, the disclosed techniques provide a condition hazard output, which may be a likelihood of repair within a time frame or a percentage change of a necessary repair being identified during an inspection of the property. The techniques may specify which types of repairs qualify as condition hazards based on their estimated cost to complete and category. For example, a condition hazard may be identified as a faulty roof or a roof that is likely to need replacement within a predetermined time period (e.g., 12 months-36 months from the date of the query). As discussed herein, the techniques may be trained on existing homes and acquired data to determine that, for example, for properties with roofs that are 7 years old or older, there is a 40% chance of a roof replacement within the predetermined time period. A newer roof (e.g., 5 years old or newer) may be associated with a lower percentage chance, e.g. 10% or less of repair. Similarly, for houses with a particular heating type, the likelihood of repair may be a different estimate based on the heating type itself, the age of the house, etc. The techniques may consider a single identified likely repair as triggering an output of a likely condition hazard. Further, not all repair types may be part of the property condition assessment. However, a user may find it beneficial to know that, in general, a particular property has a high likelihood of needing a repair within a particular time frame. The property condition output 130 may also include parameters or definitions indicating the predetermined time frame and the criteria for assessing what types of likely repairs rise to the level of a condition hazard (e.g., $5000 or greater).

Figure 6:
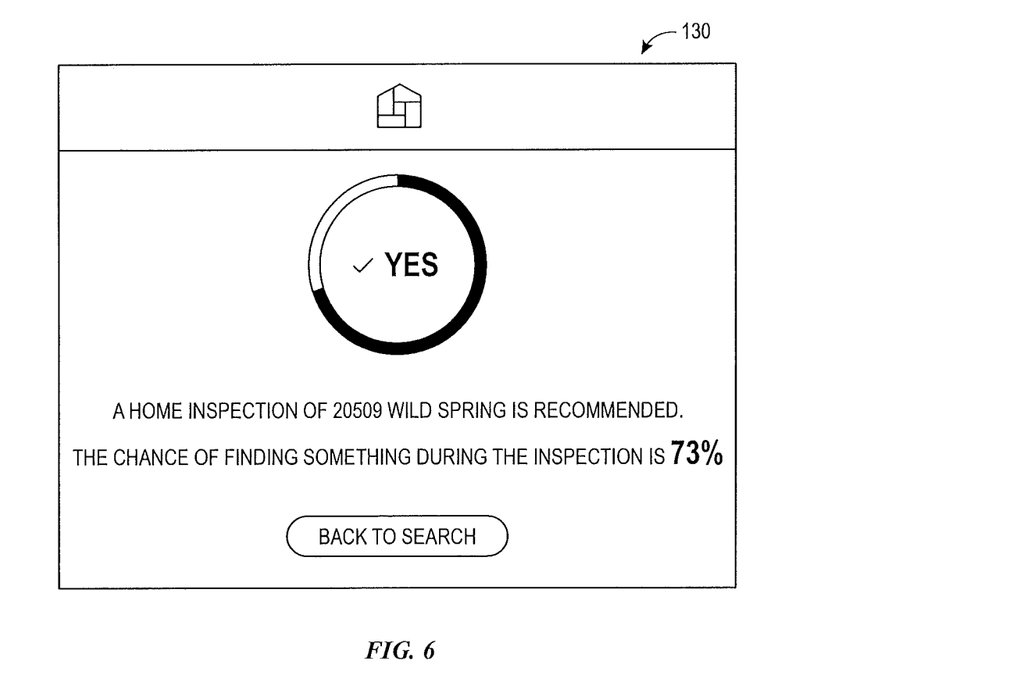
FIG. 6 illustrates an example of a graphical user interface for providing property condition information in accordance with embodiments described herein.
Figure 7:
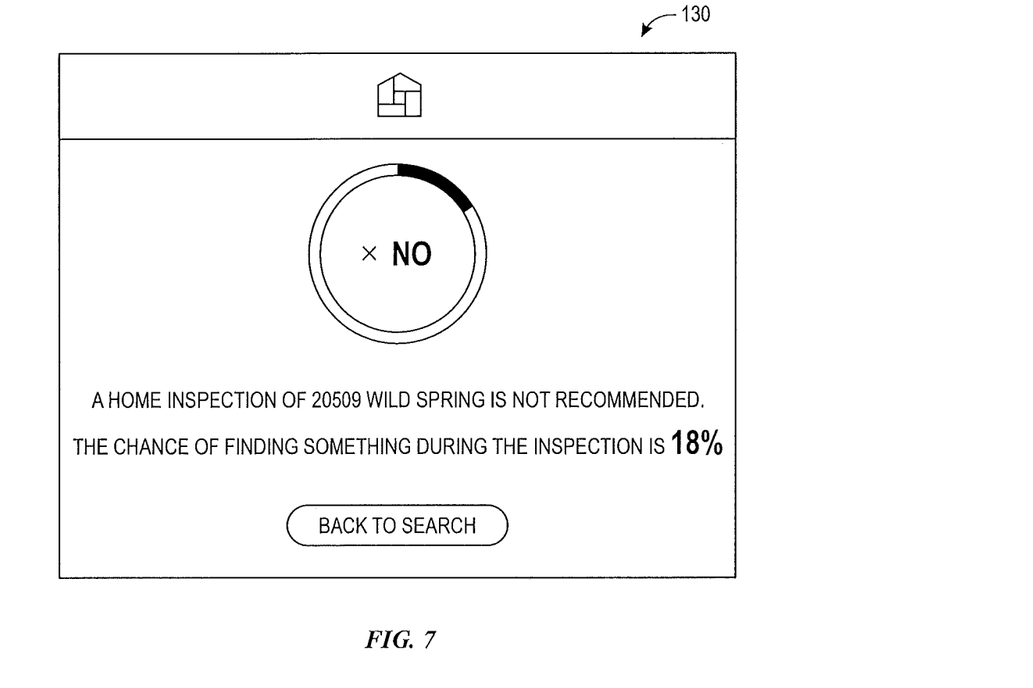
FIG. 7 illustrates another example of a graphical user interface for providing property condition information in accordance with embodiments described herein.

FIGS. 6 and 7 are examples of property condition outputs 130 that may be provided to a user. In one embodiment, the information includes a binary indication of condition hazard likelihood. For example, as shown in FIG. 6, the property condition output 130 indicates a YES for likelihood that a property inspection for a particular individual property would find a repair, and further provides a percentage likelihood. Based on this information, the user may decide to eliminate this property from consideration or may decide to order a home inspection. In another example, as shown in FIG. 7, the property condition output 130 indicates a NO for likelihood that a property inspection for a particular individual property would find a repair, and further provides a relatively lower percentage likelihood. Based on this information, the user may decide to consider this property or may decide to forego (i.e., not order) a home inspection. The separation between a YES and NO determination may be at a predetermined percentage likelihood (e.g., equal to or greater than 50% likelihood is YES and less than 50% is NO). In one example, on-demand property condition information that does not require an in-person inspection, as provided herein, may also be beneficial to users interested in foreclosed or auctioned properties that are considered "as-is." Further, the on-demand property information may reduce costs associated with ordering home inspections.

The disclosed embodiments provide the technical effect of addressing the internet-specific problem of providing on-demand estimates (e.g., within five minutes or less of making the initial query) of property condition without requiring in-person inspection of the property. That is, the disclosed embodiments eliminate the bottleneck of in-person property inspections. The disclosed embodiments assemble data from a wide variety of information sources to make estimates about property condition using primary and secondary data. The present techniques provide improved property condition estimates relative to using single variables (e.g., age of home, most-recent claim, market value).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a communication component configured to receive a user input identifying an individual property;
a memory storing a file related to the individual property, the file comprising a plurality of property information fields;
a processor configured to:
receive the user input identifying the individual property;
access primary property records associated with the individual property, wherein the primary property records comprise one or more of construction permit information associated with the individual property and an age of the individual property;
access secondary property information comprising neighborhood property records for additional properties within a predefined geographic area that includes the individual property and historical weather information relating to the predefined geographic area;
populate the plurality of property information fields of the file using the primary property records to generate filled property information fields and missing property information fields;
populate the missing property information fields with the secondary property information to generate supplemental filled property information fields;
accessing the file and using the filled property information fields and the supplemental filled property information fields as variable inputs to a property condition model, wherein the property condition model is a regression model that constrains predictions within a range, and wherein the property condition model generates a model output based on the predictions;
generate a property condition output based on the model output; and
provide the property condition output to a user, wherein the property condition output comprises a percentage likelihood of a repair finding, and wherein the percentage likelihood is represented by a graphical user icon.

2. The system of claim 1, wherein the individual property comprises a residential property.

3. The system of claim 1, wherein the secondary property information comprises construction permit information for additional properties within the predefined geographic area and wherein the construction permit information for additional properties within the predefined geographic area is used to populate a missing field when there is no construction permit information for the individual property in the primary property records.

4. The system of claim 1, wherein an individual field of the plurality of property information fields comprises a roof material field.

5. The system of claim 4, wherein the roof material field is populated using the primary property records.

6. The system of claim 4, wherein the roof material field is a missing field and is populated using secondary property information comprising satellite image data.

7. The system of claim 1, wherein an individual field of the plurality of property information fields comprises a roof age field.

8. The system of claim 7, wherein the roof age field is a missing field and is populated using secondary property information comprising roof age information of one or more of the additional properties within the predefined geographic area.

9. The system of claim 1, wherein the primary property records and the secondary property information are accessed from one or more of city databases, weather services, mortgage records, or title records.

10. The system of claim 1, wherein the primary property records and the secondary property information do not include in-person inspection information.

11. A method, comprising:
using a processor:
receiving user input identifying an individual property;
creating and storing a file associated with the individual property in response to receiving the user input;
accessing primary property records associated with the individual property, wherein the primary property records comprise one or more of construction permit information associated with the individual property and an age of the individual property;
accessing secondary property information comprising neighborhood property records for additional properties within a predefined geographic area that includes the individual property and historical weather information relating to the predefined geographic area;
populating property information fields of the file using the primary property records and the secondary property information;
determining that a minimum set of property information fields is populated in the file;
determining a condition of the individual property by accessing the file and using the populated property information fields as variable inputs to a property condition model when the minimum set is populated, wherein the property condition model is a regression model that constrains predictions within a range, and wherein the property condition model generates a model output based on the predictions;
generating a property condition output based on the model output of the property condition model with the variable inputs; and
providing the property condition output to a user, wherein the property condition output comprises a percentage likelihood of a repair finding, and wherein the percentage likelihood is represented by a graphical user icon.

12. The method of claim 11, wherein the property condition output comprises recommending ordering an in-person inspection for the individual property.

13. The method of claim 12, wherein the percentage likelihood of repair finding as a result of the in-person inspection.

14. The method of claim 12, comprising providing a communication to an inspector based on the property condition output to schedule the in-person inspection.

15. A method, comprising:
receiving a request from a user device;
determining a location of the user device based on GPS information of the user device;
accessing primary property records associated with a plurality of individual properties within a predetermined distance of the user device, wherein the primary property records comprise one or more of construction permit information associated with the plurality of individual properties and an age of the plurality of individual properties;
accessing weather information for the predetermined geographic area including the plurality of individual properties;
determining a condition of each of the plurality of individual properties based on a property condition model using the primary property records and the weather information as inputs to the property condition model, wherein the property condition model is a regression model that constrains predictions within a range, and wherein the property condition model generates a model output based on the predictions;
generating a property condition output for each of the plurality of individual properties based on the model output; and
providing the property condition output for each of the plurality of individual properties to a user, wherein the property condition output comprises wherein the property condition output comprises a graphical user icon illustrating a graphical depiction of a percentage likelihood of a repair finding for each of the plurality of individual properties and wherein the percent likelihood is represented by a graphical user icon.

16. The method of claim 15, comprising automatically opening a navigation application on the user device and providing navigation instructions to a nearest individual property of the plurality of individual properties only when the property condition output of nearest individual property has the percentage likelihood of the repair finding being below a predetermined threshold.

17. The method of claim 15, wherein the property condition output comprises a neighborhood output based on an average of the property condition outputs.

18. The method of claim 15, wherein the weather information comprises a number of severe weather days in the location of the user device.

19. The system of claim 6, wherein the processor is programmed to assess the satellite image data to find a closest match roof among the additional properties to the individual property and to identify a roof type or roof age of the closest match based on the secondary property information to populate the missing field.

20. The system of claim 1, wherein the missing property information fields comprise a property age field, and wherein the property age field is filled using an age range of the additional properties in the predefined geographic area when the age range is within a band of a certain size.

* * * * *

UNITED STATES PATENT AND TRADEMARK OFFICE
CERTIFICATE OF CORRECTION

| | | |
|---|---|---|
| PATENT NO. | : 11,017,487 B1 | Page 1 of 1 |
| APPLICATION NO. | : 15/826293 | |
| DATED | : May 25, 2021 | |
| INVENTOR(S) | : Joseph Campbell et al. | |

It is certified that error appears in the above-identified patent and that said Letters Patent is hereby corrected as shown below:

On the Title Page

1. Item (71), under "Applicant", in Column 1, Line 1, delete "UIPCO, LLC, San Antonio, TX (US)" and insert -- United Services Automobile Association (USAA), San Antonio, TX (US) --, therefor.

In the Specification

2. In Column 6, Line 4, delete "etc," and insert -- etc., --, therefor.

3. In Column 9, Line 24, delete "on" and insert -- in --, therefor.

In the Claims

4. In Column 14, Line 34, in Claim 15, delete "percent" and insert -- percentage --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*